E. LANG.
BEET HARVESTER.
APPLICATION FILED APR. 15, 1909.

984,572.

Patented Feb. 21, 1911.
3 SHEETS—SHEET 1.

WITNESSES:
Roy Wallis.
Christine A. Braidel.

INVENTOR
Edward Lang
BY
Geo. B. Willey
ATTORNEY

E. LANG.
BEET HARVESTER.
APPLICATION FILED APR. 15, 1909.

984,572.

Patented Feb. 21, 1911.

3 SHEETS—SHEET 3.

WITNESSES:

INVENTOR
Edward Lang
BY
ATTORNEY

UNITED STATES PATENT OFFICE.

EDWARD LANG, OF KOCHVILLE, MICHIGAN.

BEET-HARVESTER.

984,572.  Specification of Letters Patent.  Patented Feb. 21, 1911.

Application filed April 15, 1909. Serial No. 490,122.

*To all whom it may concern:*

Be it known that I, EDWARD LANG, a citizen of the United States, residing at Kochville, in the county of Saginaw and State of Michigan, have invented certain new and useful Improvements in Beet-Harvesters; and I do hereby declare the following to be a full, clear, and exact description of the invention, such as will enable others skilled in the art to which it appertains to make and use the same.

My invention relates to harvesters for root crops of all kinds, but is principally designed for harvesting sugar beets, and belongs to that type wherein the beets are topped before they are removed from the ground.

Heretofore it has been customary to provide a pair of plows arranged at an angle to each other. It is assumed that the points or toes of the plows will pass beneath the bulge of the beets in order that the inclined upper edges of the plows engaging the bulge may lift or ease the beets upward out of the ground. Viewed from a practical standpoint, however, this arrangement does not operate in all cases. Beets grow best in a stiff clayey soil which opposes considerable resistance to the passage of a plow. Furthermore, beets are harvested in the fall and the weather conditions are often such as to convert the fields into a muddy bog, or else the ground is baked hard. From my experience, I have found that under normal weather conditions, the earth is "mellow" immediately surrounding the beet, but at a little distance is hard and unyielding. Beets may also grow high above or deep into the ground, and a harvester must be designed to meet all these conditions. Furthermore, beets are of different sizes, so that it is impossible to devise a pair of lifting plows which will neither pass entirely by the small beets nor mutilate the large beets.

The object of my invention is the provision of a lifting mechanism which is adjustable for beets of different sizes and one which will yield without breaking, in the event that it engages an obstruction.

To this and other ends, therefore, my invention consists in certain novel features and combinations of parts, such as will be more fully described hereinafter and particularly pointed out in the claims.

Figure 1:
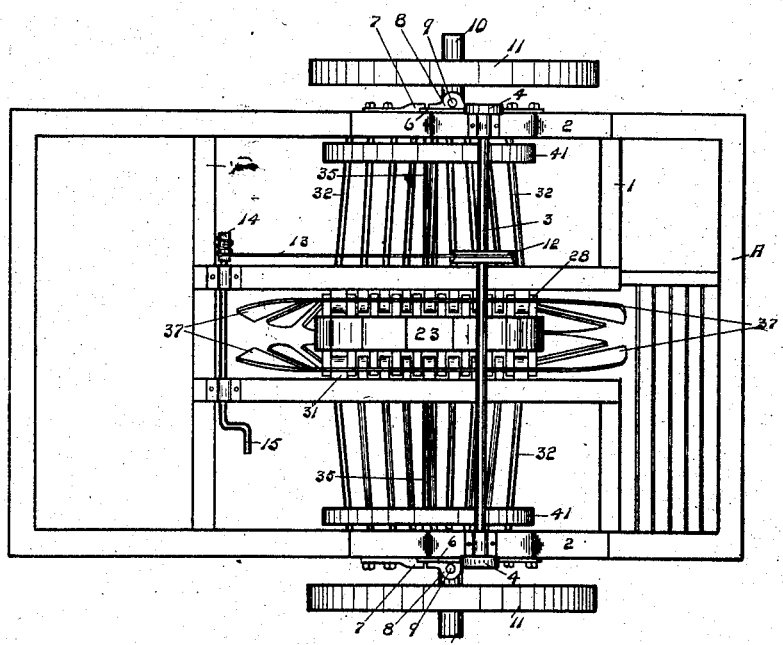
Figure 2:
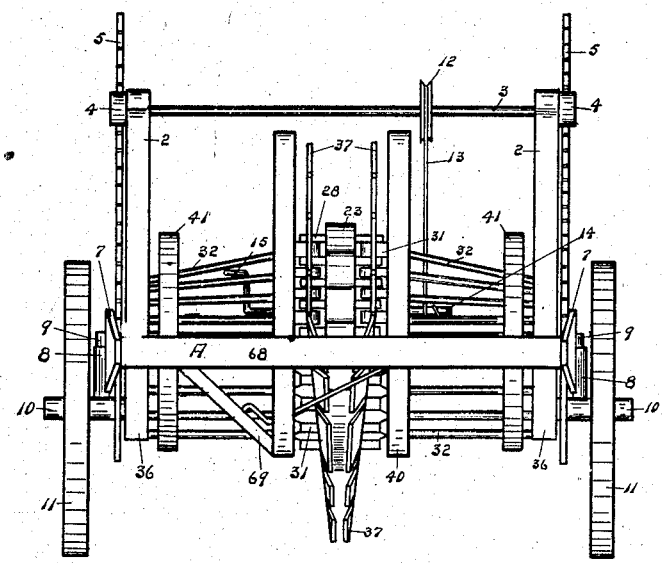
Figure 3:
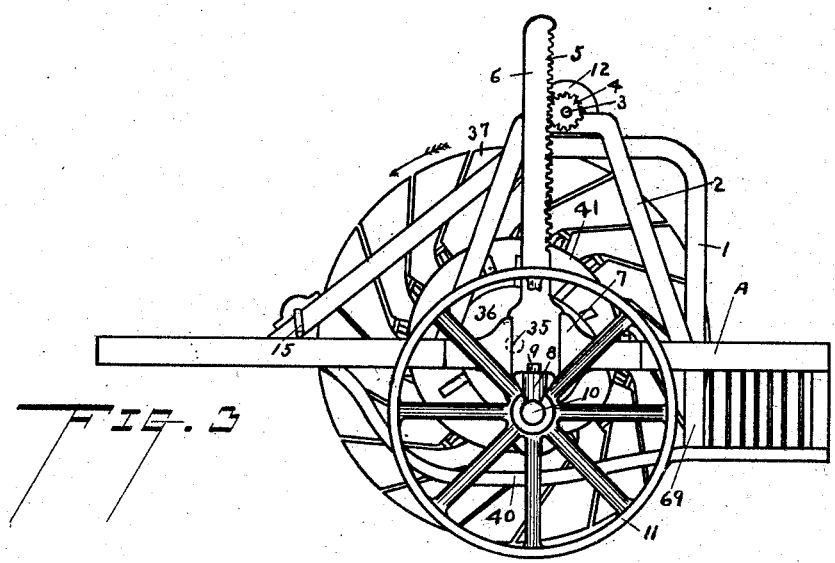
Figure 4:
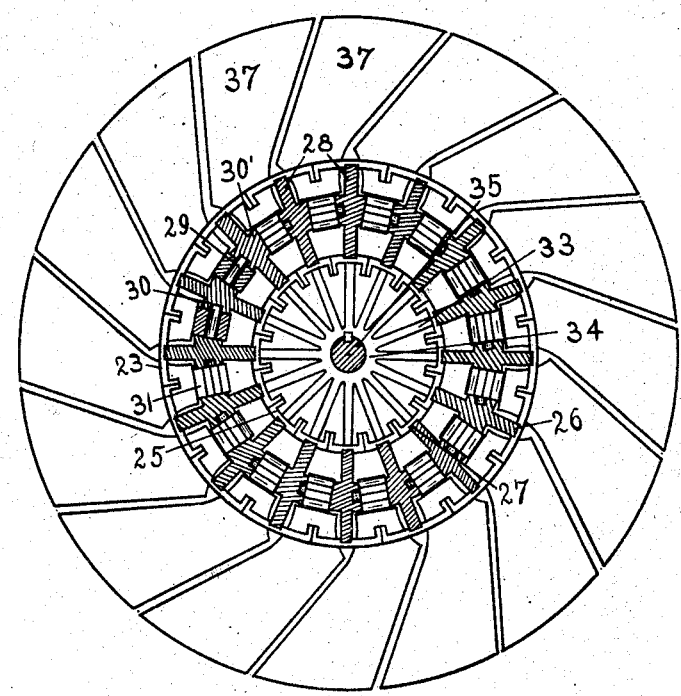
Figure 5:
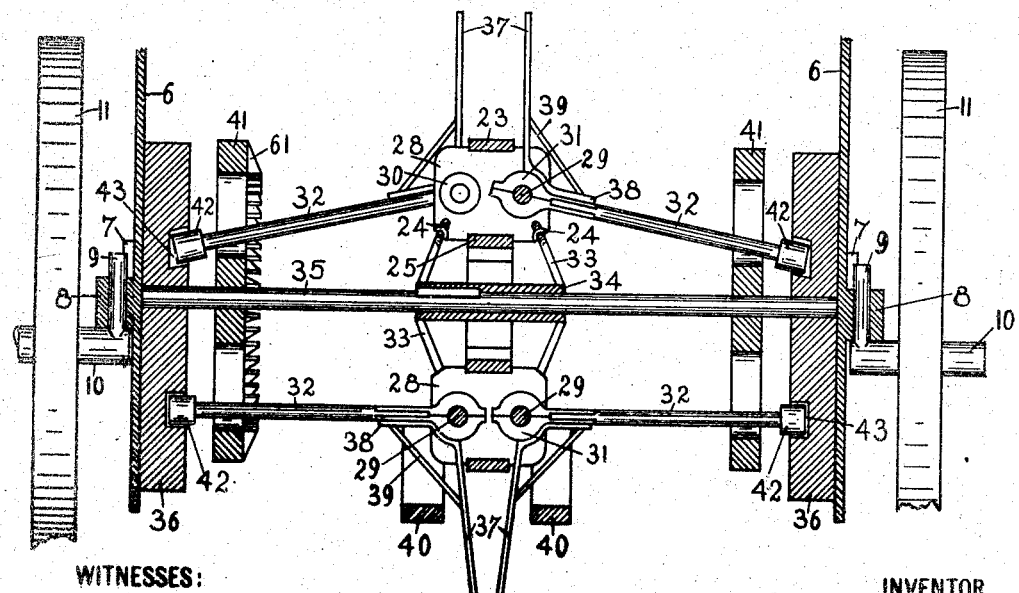

In the accompanying drawings, Figure 1 is a top plan view of my invention, Fig. 2 is a rear end view thereof, parts being omitted to better disclose the construction, Fig. 3 is a side view, Fig. 4 is a detail sectional view of the spading wheel, Fig. 5 is a detail sectional view of the spading wheel and connected mechanism. Fig. 6 is a detail view of the plate of the spading wheel. Fig. 7 is a detail view of the cam for actuating the blades or spades.

In my invention I lift a strip of ground including the beets. After the machine has passed along a row, it will appear as though a trench had been dug and filled in with loose earth, the ground surface showing that it has been broken, not as though by a plow, but as though by spades. To accomplish the lifting of the beets, I prefer to provide means which actually raise the earth around and containing the beets, practically by the spadeful, and dump such earth and beets commingled, into a screen whereby the loose earth is permitted to fall back into the hole from which it was removed, while the beets are tossed into a suitable receptacle, all of which is accomplished mechanically.

More particularly, my invention consists in the provision of a series of pairs of spade members traveling in a circle and adapted to take into the ground at an angle, the members of each pair converging toward each other just as though two men with spades were to dig into the ground on opposite sides of a "stand" of beets to raise the stand. Mechanism is provided to elevate the pairs of spade members with the material clamped between the members and when it has attained a sufficient height, to cause the members to release the material which drops into a screen. There the beets are separated from the earth, the earth dropping through the screen to the ground, while forks engage the beets and toss them into a suitable receptacle which is dumped from time to time.

Referring to the drawings, A indicates a horizontal frame, preferably rectangular in shape, and provided with suitable cross braces 1, 1. The lifting mechanism is carried by the frame, and in order to provide means for permitting the transportation of the harvester from place to place and maintain the parts out of operation, I provide the bridges 2, 2, mounted on the longitudinally extending members of the frame, a shaft 3 being journaled on the bridges, the shaft carrying gears 4, 4 meshing with racks 5, 5 on the vertical standards 6, 6. These standards intermediate their ends, are received in ways 7, 7, conveniently located on the frame. Bearings 8, 8, on the standards pivotally receive the vertical pintles 9, 9, carried by the skeins 10 on which the traction wheels 11 are journaled. A drum 12 on the shaft 3 is adapted to receive several coils of a cable 13, whose opposite end is secured to a windlass 14 mounted on a crank 15 journaled on the frame A. The weight of the lifting mechanism tends to draw the frame down relative to the traction wheels, and the depth to which the spades of the lifter shall enter the ground may be adjusted by the cable and windlass. When it is desired to transport the machine from place to place, the cable is wound on the windlass. This operates to unwind the cable on the drum, which imparts motion to the shaft in such direction as to cause the gears to climb the rack and raise the lifting and topping mechanism above the surface of the ground. Any suitable mechanism, as a ratchet and pawl, may be employed to prevent accidental unwinding of the windlass when the machine is in adjusted position. This means being old and well known and forming no part of my invention, is not shown. It is also obvious that the windlass and crank may be arranged otherwise than as shown, without departing from my invention.

My lifting mechanism consists broadly in the provision of a rotatable member on which is circularly arranged a series of pairs of blades or spades, the individual members of each pair being arranged opposite one another. These spades are adapted for a swinging movement toward and from each other. When the spades are being inserted in the ground, means are provided whereby they are swung toward each other on two opposite sides of the stand of beets. The spades sink into the ground on converging planes and are maintained in this constricting position as they are drawn laterally out of the ground. This operation causes the spades to grip the earth and the therein-contained beets and raise the earth as the rotatable member revolves. When the spadeful attains a certain height, the spades are automatically swung open or away from each other to release the earth and beets. Such release is adapted to take place when the earth is over a suitable screening device adapted to receive the successive spadefuls of earth and beets and to separate the beets from the earth and deliver them to one side, the earth returning to the furrow or trench from which it was removed.

More in detail, my lifting mechanism comprises a wheel-like member consisting of an outer rim preferably formed of the flanged sections 23, 23 fastened together in any suitable manner. Concentric with the outer rim is an inner sectional rim 25 formed in an exactly similar manner. The concave inner faces of the sections 23 of the outer rim are recessed as at 26, at points radially opposite to similar recesses 27 on the convex faces of the sections of the inner rim. These recesses are adapted to receive the outer and inner edges respectively, of radially extending plates 28. Parallel studs 29, 29 arranged in pairs project from one side face of these plates, the outer free ends of the studs being received in recessed bosses 30, 30, formed on the backs of the plates next adjacent thereto. The roots of the studs are equipped with similar bosses 30', such bosses being round and having their outer faces lying parallel with the outer faces of the bosses on the backs of the next plates. The studs and bosses coöperate to form parallel sided journals for the reception of the bearing boxes 31, 31, carried by the inner adjacent ends of the bars 32, 32, such bars being preferably resilient to permit the spades carried thereby to give, in case they impinge against a stone or by reason of any other strain. The opposite inner corners of the plates are provided with ears 24, 24, to which are secured the outer sides of the diverging spokes 33, 33, the inner ends of the spokes being secured in any suitable manner to a hub 34, fast on a shaft 35, the opposite ends of the shaft being suitably journaled in a stationary portion 36 of the frame.

From the foregoing, it is plain that I have devised what I may term a wheel, consisting of an inner rim and a concentric outer rim, the annular space between which is separated into compartments by means of the plates 28. The opposite sides of the plates project past the planes of the rims, which retain the plates in position, and the studs 29 project from those portions of the sides of the plates which project beyond the plane of the outer rim.

The spades are carried by the bearings 31, 31, such spades each consisting of a normally vertically extending substantially fan-shaped blade 37, having a laterally extending base 38 seated on the bearing, a brace 39 extending from the base to the blade intermediate its ends to afford strength and to prevent the blade from buckling or bending. These spades are arranged in pairs, the individual members of which are opposed and spaced apart from each other by the outer rim. The blades of each pair which are wider at their outer than at their inner ends, are permitted a movement toward each other from their parallel positions, such movement being limited only by the contact of their inner faces with the opposite side edges of the outer rim, the blades extending some distance beyond the outer rim. The outward or divergent movement of the blades is limited by a pair of runners 40, 40, extending longitudinally of the frame, such runners resting on the ground on the opposite sides of the spading wheel and operating to support the machine when in operation. As one means for automatically effecting the swinging movement of the individual members of each pair of blades toward and from each other, I provide the circularly arranged series of bars 32, 32, the inner ends of which are secured to the bearing boxes. These bars pass through radial slots in guide members 41 fast on the shaft 35 and located adjacent the stationary portions 36 of the frame. The outer ends of the oppositely extending bars are equipped with rolls 42, 42 received in a cam groove 43 formed in the portions 36 eccentrically of the shaft 35. The shape of the cam groove is illustrated more particularly in Fig. 7 and its position with reference to the frame is shown in Fig. 3. The rolls and bars move relatively to the cam groove in which the rolls travel, and the groove is so positioned relative to the wheel that, as the wheel rotates, in the direction of the arrow, Fig. 3, and just before the blades are about to strike the earth, the successive rolls engage the curved portion $x$ of the groove, which causes the bars to assume the horizontal position shown at the bottom of Fig. 5, thereby inclining the blades inward, whereupon the weight of the machine forces the blades into the ground on opposite sides of the stand of beets, just as a spade is forced into the ground by the foot of the operator. The blades are held in their inclined positions, embracing a wedge-shaped spadeful of earth and beets, which spadeful is raised as the wheel rotates until it is held above a screen, at which time the rolls successively pass into the widened portion $y$ of the groove which causes the bars to assume the angular position shown in the upper part of Fig. 5, which operates to throw the blades apart, whereby the spadeful of earth and beets is deposited on the screen. The bars 32 carrying the blades are guided in their lateral movement by the slots in the guide members 41 on the shaft 35. The strain on the cam groove is brought to bear on that part indicated at $x$ and in order that new parts, if necessary, may be substituted from time to time as desired, I make this section $x$ of the frame removable. If it is desired to vary the angle at which the blades will be set, a section having a groove formed on more or less of a parabolic curve, can be inserted and fastened in place in any suitable manner. The rolls, as they traverse the groove, are drawn out of or forced into the groove, the rolls when holding the blades in inclined position, abutting the back of the groove. The groove is widened at the part indicated at $y$, to afford play to the blades, whereby stones or other substances which may become wedged between the longitudinal edges of the blades, are released and in this connection scrapers of any suitable design (not shown) may be employed to scrape the blades free from mucky soil, clay or dirt.

It is obvious that, as the circularly arranged blades are set closely together and successively cut into the soil, they will, in effect, dig a continuous trench coincident with the rows of beets.

Obviously, my invention can be used for harvesting other root crops besides beets and it is evident that changes might be made in the form and arrangement of the several parts described, without departing from the spirit and scope of my invention.

Having thus fully disclosed my invention, what I claim as new, is:—

1. A harvester for root crops comprising a frame, a lifter carried by the frame, the lifter consisting of a shaft journaled in the frame, a spading wheel fast on the shaft, the wheel comprising inner and outer concentric rims, plates radially disposed in the annular space between the rims, a hub, spokes connecting the plates and hub, studs arranged in pairs and projecting from one face of each plate, annular bosses on the backs of the respective plates, the free ends of the studs receivable in the bosses, other bosses at the roots of the studs, the outer faces of the bosses at the roots of the studs lying parallel with the outer faces of the bosses on the back of the next adjacent plate, bearings received on the respective studs, blades mounted on the bearings, and means for oscillating the bearings to move the pairs of blades toward and from each other.

2. A harvester for root crops consisting of a frame, a lifter carried by the frame, the lifter comprising an inner rim, a sectional outer rim concentric therewith, plates interposed between the inner and outer rims, studs carried by the plates, the studs arranged in pairs, bearings on the studs, blades on the bearings, and means for oscillating the bearings to move the blades toward and from each other.

3. A harvester for root crops consisting of a frame, a lifter carried by the frame, the lifter comprising a shaft, a rotatable member fast on the shaft, annularly arranged series of rods projecting toward the member from opposite sides thereof, the adjacent ends of the rods being pivotally connected with the member, blades carried by the rods, and slotted guides on the shaft, the rods projecting through the slots, the opposite sides of the frame having cam grooves formed therein, the outer ends of the rods received in the grooves.

4. A harvester for root crops consisting of a frame, a lifter on the frame, the lifter comprising a rotatable rim, pivotally supported blades arranged in pairs, the individual members of each pair located on opposite sides of the rim, means for moving the individual members toward and from each other, the rim limiting the movement of the members toward each other, and runners carried by the frame and lying opposite the outer faces of the blades to limit their movement away from each other.

5. A root harvester comprising traction wheels, a frame supported thereby, a shaft journaled in the frame independent of the traction wheels, a spading wheel on the shaft, the frame provided with cam grooves relative to which the spading wheel rotates, circular series of rods arranged in opposed pairs, the adjacent ends of the opposed pairs of rods pivotally secured to the spading wheel, the opposite ends of the rods received and traveling in the cam grooves, and spades mounted on the rods.

6. A root harvester comprising a frame, a spading wheel rotatable relative to the frame, the frame provided with cam grooves, circularly arranged series of rods arranged in pairs end to end, the inner adjacent ends of the rods being pivotally secured to the wheel, the outer ends of the rods received and traveling in the respective cam grooves, and spades mounted adjacent the inner ends of the respective rods.

7. A root harvester comprising a frame, a spading wheel rotatable relative to the frame, spades pivotally mounted in opposed pairs relative to the wheel, the spades overlying each other, the outer ends of the spades lying in rear of their pivotal supports, and means for moving the spades toward and from each other.

8. A root harvester comprising a frame, a spading wheel rotatable relative to the frame, the frame provided with cam grooves, circularly arranged series of rods arranged in pairs end to end, the inner adjacent ends of the rods being pivotally secured to the wheel, the outer ends of the rods received and traveling in the respective cam grooves, slotted guides through which the rods pass, and spades mounted adjacent the inner ends of the respective rods.

9. A root harvester comprising a frame, a shaft journaled in the frame, a spading wheel on the shaft, the frame provided with cam grooves on opposite sides of the wheel, which grooves are arranged eccentrically relative to the shaft and are of oval shape, the major axes of which grooves extend at an angle to the horizontal, the walls at one point in the grooves being spaced farther apart from each other than throughout the remainder of the grooves, circularly arranged series of oppositely extending rods, the inner ends of which are pivotally secured to the spading wheel, the outer ends of the rods received and traveling in the respective cam grooves, and spades mounted on the rods.

10. A root harvester comprising a frame, a shaft journaled in the frame, a spading wheel on the shaft, the frame provided with cam grooves on opposite sides of the wheel, which grooves are arranged eccentrically relative to the shaft and are of oval shape, the major axes of which grooves extend at an angle to the horizontal, a portion of the frame in which each cam groove is formed being removable, circularly arranged series of oppositely extending rods, the inner ends of which are pivotally secured to the spading wheel, the outer ends of the rods received and traveling in the respective cam grooves, and spades mounted on the rods.

In testimony whereof, I affix my signature in presence of two witnesses.

EDWARD LANG.

Witnesses:
RALPH S. WARFIELD,
CHRISTINE A. BRAIDEL.